Patented Sept. 19, 1939

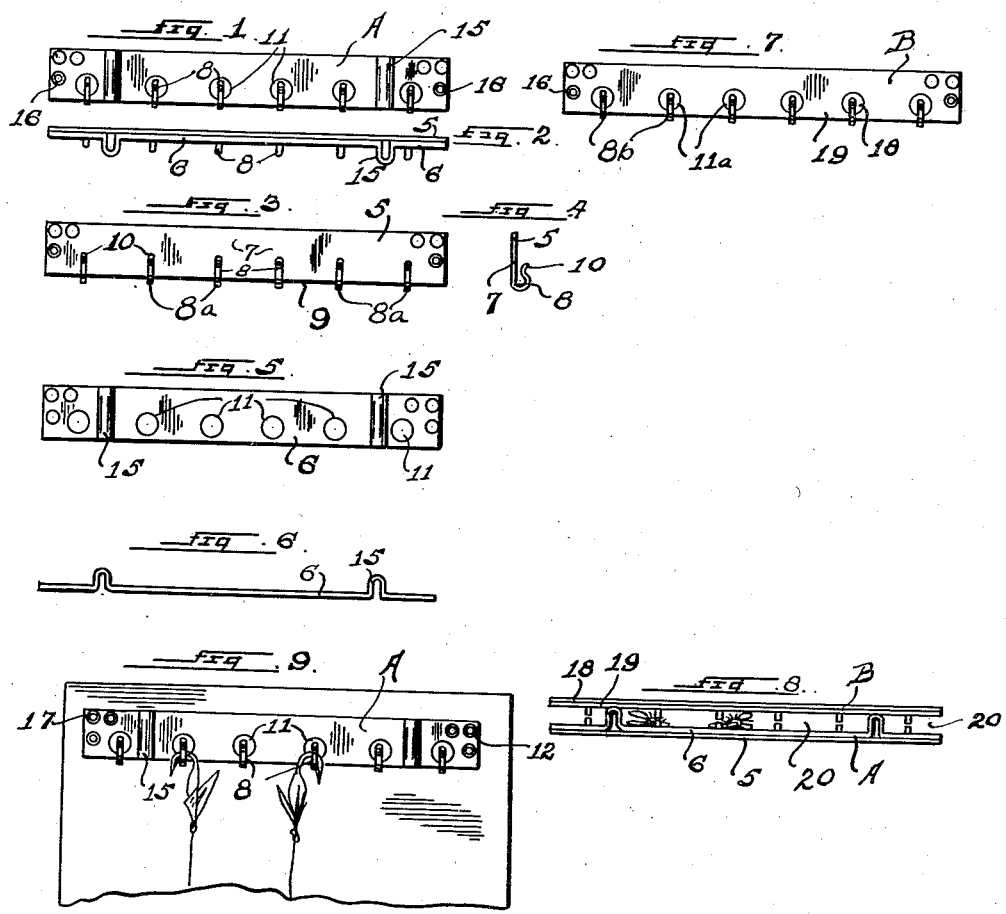

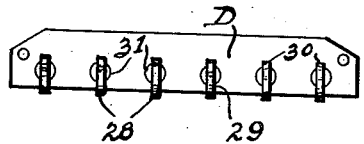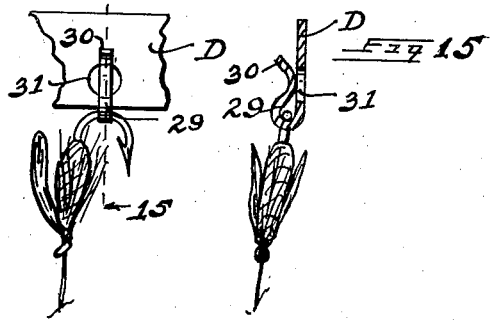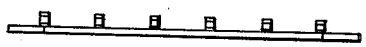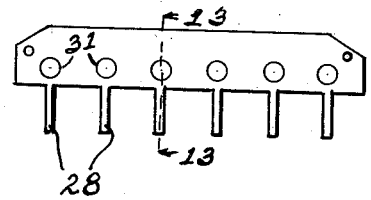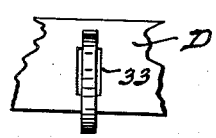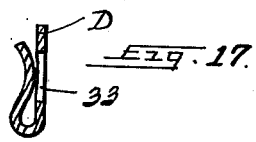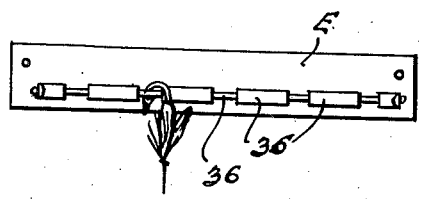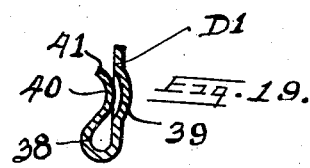

2,173,395

UNITED STATES PATENT OFFICE 2,173,395

HOOK RACK FOR FLY BOOKS

Glen P. Heiner, Salt Lake City, Utah

Application June 20, 1936, Serial No. 86,214

5 Claims. (Cl. 43—32)

My invention relates to hook racks for fly books and has for its object to provide a new and efficient hook rack for holding hooks in position in fly books. This invention is particularly adaptable for snelled fly hooks or bait hooks but primarily for fly hooks.

A further object is to provide a new and efficient hook rack for use in any fly book which hook rack will hold the hook firmly in place at all times and which will retain the hook from becoming loose or from crushing the feathers of the fly hook thereby spoiling the pattern of the fly.

A still further object is to provide a hook rack having a bent back hook engaging clamp or trap set over an opening so that the hook has space in which it may be inserted into place under the clamp but which will hold the hook in fixed position until it is desired to remove it.

A still further object is to provide a two piece hook rack which will be made of a back plate of phosphorous bronze with the hook clamps made therefrom and bent up and around over the main body of the plate from which it is made and having another plate of zinc made with holes therethrough in alignment with the clamps of the bronze plate with the two plates secured together so that each clamp is directly over one of the openings in the zinc plate. This is for two purposes, first, to prevent rusting and discoloring of the fish hook where the hook engages the hook rack, and second, to hold the hook in its proper position.

A still further object is to provide a spacer hump or lug formed on one set of plates to space two abutting leaves of a fly book apart so that the pattern of the fly or wings of the fly will not be crushed or disheveled.

A still further object is to provide a rack for fish hooks which is less active chemically to rust the steel from which the hooks are made.

A still further object is to provide a rack for fish hooks in which the material used is either zinc or phosphorous bronze, or in which the rack is cadmium plated, thus providing a rack which is less active chemically than steel or the material from which fish hooks are made. Thus, there is a chemical reaction set up by the zinc rack or the cadmium plated rack which offsets the natural tendency to rust, common to fish hooks when they are put away damp or wet after fishing.

These objects I accomplish with the device illustrated in the accompanying drawing in which similar numerals and letters of reference indicate like parts throughout the several views and as described in the specification forming a part of this application and pointed out in the appended claims.

In the drawings

Figure 1 is a plan view of one of the hook racks.

Figure 2 is an edge view of Figure 1 from the top looking down.

Figure 3 is a face view of the back bronze plate.

Figure 4 is an end view of Figure 3.

Figure 5 is a face view of the front zinc plate.

Figure 6 is an edge view of Figure 5.

Figure 7 is a face view of the hook rack used in conjunction with that type shown in Figure 1 in which there are no raises or bosses.

Figure 8 is an edge view of Figure 1 and Figure 7 shown together as when secured on two opposing leaves of a fly book showing the space between the leaves left by the use of spacer shown on the type shown in Figure 1.

Figure 9 is a face view of one of the hook racks like that shown in Figure 1 in place on a book leaf with two flies shown in place.

Figure 10 is a plan view of a single plate type of hook rack.

Figure 11 is an edge view of Figure 10.

Figure 12 is a plan view of the plate before the hook clamps are bent.

Figure 13 is a sectional view on line 13—13 of Figure 12.

Figure 14 is a plan view of an enlarged section of Figure 10 with a fly hook in place.

Figure 15 is a section on line 15—15 of Figure 14.

Figure 16 is a view of a modified form of plate in which the opening in back of the clamp is shown as rectangular.

Figure 17 is a vertical section through the clamp and opening.

Figure 18 is a face view of a further mode of holding flies by the use of a cord.

Figure 19 is a section of a modified form of hook rack in which a depression is formed under said rack.

In the drawing I have shown the rack for holding the hooks as A. This rack A is made of a back plate 5 and front plate 6, and with the back plate made as shown in Figures 3 and 4. This back plate is made of a strip of spring material, that preferred being phosphorous bronze. The plate consists of a back 7 having small narrow strips or individual hook racks 8 formed on the lower edge 9 of the plate and having these racks bent up and into an arc or loop 8a with the end 10 bent back away from the plate in a curve under which the fish hook is first engaged when inserting it into the individual rack.

The front plate 6 is made of a strip of metal having openings 11 perforated therethrough with each of said openings in a position adapted to fit directly under each of said racks. Each end of the plate 6 is provided with a raised portion or spacer lug 15 formed near each end of the plate to act as the spacer for protecting the fly wings and hackle from crushing and disfiguring when in the book. These two plates are then placed together as shown in Figures 1 and 2 with the plate 6 set in that space between the racks 8 and the back 7 and with each rack 8 spaced directly in alignment with each opening 11. These two plates are then secured together by rivets 16. They are then set onto a leaf of a fly book and secured in place by the rivets 12 and 17. The leaf is then ready for use.

The other rack B used in connection with the rack A on the opposite sheet or leaf of the book is made of a back plate 18 similar to the plate 5, and the front plate 19 is identical to the plate 6, with the exception that there are no lugs or spacers on this plate 19. The front plate 19 has openings 11a similar to the openings 11 and the plate 6 and the back plate 18 has racks 8b similar to the racks 8 of the plate 5.

When used together, the two plates have a space 20 therebetween.

In Figures 10 to 15 I have shown the hook rack as made of a simplified single back plate D with the bottom edge provided with spaced apart thin strips of metal 28 having said strips bent back around in a loop 29 with the end curved out at 30 and directly under this loop and end I provide openings 31 through the plate in a manner similar to that shown in Figures 1 to 9. The difference being that in this type of rack I use but one plate and have the hook racks and the openings in a single plate.

In Figures 16 and 17 I have shown the plate D provided with a rectangular opening 33 instead of the round opening shown in the other figures. This type of opening holds more tightly on the hooks but has more chance of making them rough than when a round hole is used.

In Figure 18 I have shown a still further type of hook rack in which the back plate E is provided with cylinders 35 on the front face thereof and a cord or wire 36 is threaded through these cylinders, the hooks to be engaged over the wire between the cylinders.

These devices are also shown in my copending application for patent for fly book and other applications corelative to that book.

A further modified form of making the hook rack is shown in Figure 19 in which the back plate is shown as D1 having a hook rack 38 bent up and around to the front of the plate to fit down over a depression 39 which is imprinted into the plate D1. The end of the rack 38 is curved down at 40 and then curved up at the extreme end at 41 to provide a guide means to allow for placing the hook under the end and into the loop or the rack 38.

Having thus described my invention I desire to secure by Letters Patent and claim:

1. In a hook rack for fly books, the combination of a back plate having one side formed with depending strips of spring metal bent back into an arc to form hook clamps and a front plate having openings therein secured to said back plate with the openings in said front plate spaced directly under the free ends of said clamps.

2. In a hook rack for fly books the combination of a back plate made of phosphorous bronze, and having hook clamps formed thereon bent forwardly and upwardly in an arc around the front face to form hook engaging clamps; and a front plate similar in exterior outline to said back plate made of zinc and having holes therethrough adapted to be arranged directly under the bent back ends of the hook clamps of the back plate.

3. In a hook rack for holding snelled hooks the combination of a back plate having spaced apart hook clamps formed on the lower edge thereof and bent around in an arc with the free ends curved up away from the body of the back plate; and a face plate secured over said back plate having openings therein and arranged directly under the free ends of said hook clamps to allow for insertion of the curve of the hook in the opening when engaging the hook under the clamp to eliminate excessive bending of the clamp when hooks are inserted thereunder.

4. A hook rack for fly books comprising, a back plate having clamps formed thereon and bent forwardly and upwardly over the front face to exterior outline loop-shaped clamps; and a front plate having openings therein similar in form to and secured on said back plate with the openings in said front plate arranged directly under the free ends of said hook clamps.

5. A hook rack for fly books comprising, back plates similar in exterior outline secured to opposite leaf sections of a fly book; a front plate having openings therein secured to each of said back plates, one of said front plates having lugs formed on the front side thereof to space the two leaf sections apart and permit ample room for the fly hooks therebetween; and hook clamps formed on the back plates bent forwardly and upwardly over the front plates over the openings in the front plates with the openings arranged directly under the free ends of said clamps.

GLEN P. HEINER.